United States Patent [19]
Tateishi

[11] Patent Number: 5,745,460
[45] Date of Patent: Apr. 28, 1998

[54] DISK DISCRIMINATING METHOD AND APPARATUS

[75] Inventor: Kiyoshi Tateishi, Tsurugashima, Japan

[73] Assignee: Pioneer Electronic Corporation, Tokyo, Japan

[21] Appl. No.: 620,612

[22] Filed: Mar. 22, 1996

[30] Foreign Application Priority Data

Mar. 24, 1995 [JP] Japan ................................ 7-066531

[51] Int. Cl.$^6$ .................................................. G11B 19/12
[52] U.S. Cl. .................................................. 369/58; 369/50
[58] Field of Search ..................... 369/54, 46, 27, 369/58, 44.25, 53, 47, 13, 50, 190, 124

[56] References Cited

U.S. PATENT DOCUMENTS

| | | | |
|---|---|---|---|
| 5,003,521 | 3/1991 | Yoshida et al. | 369/54 |
| 5,202,874 | 4/1993 | Zucker et al. | 369/41 |
| 5,289,451 | 2/1994 | Ahsinuma et al. | 369/54 |

OTHER PUBLICATIONS

Japan 362134862 A "Magnetic Disk Device" Jun. 17, 1987 (Abstract Only).
Japan 361170929A "Optical Information Reproducing Device" (Abstract Only), Aug. 1986.
Japan 404067463A "Rotating Driving Device for Disk" (Abstract Only), Mar. 1992.

Primary Examiner—Thang V. Tran
Attorney, Agent, or Firm—Morgan, Lewis & Bockius LLP

[57] ABSTRACT

A disk discriminating method and disk discriminating apparatus accurately discriminate plural types of disks with different recording densities. While a disk is rotated by a constant number of rotations, a recorded signal is read from the disk to acquire a read signal, one of the maximum period, minimum period, maximum inversion interval, minimum inversion interval and average frequency of the read signal is detected, and the type of the disk is determined in accordance with the detected value. This structure needs only a simple circuit, and no special mechanism, to be added to a disk player.

4 Claims, 5 Drawing Sheets

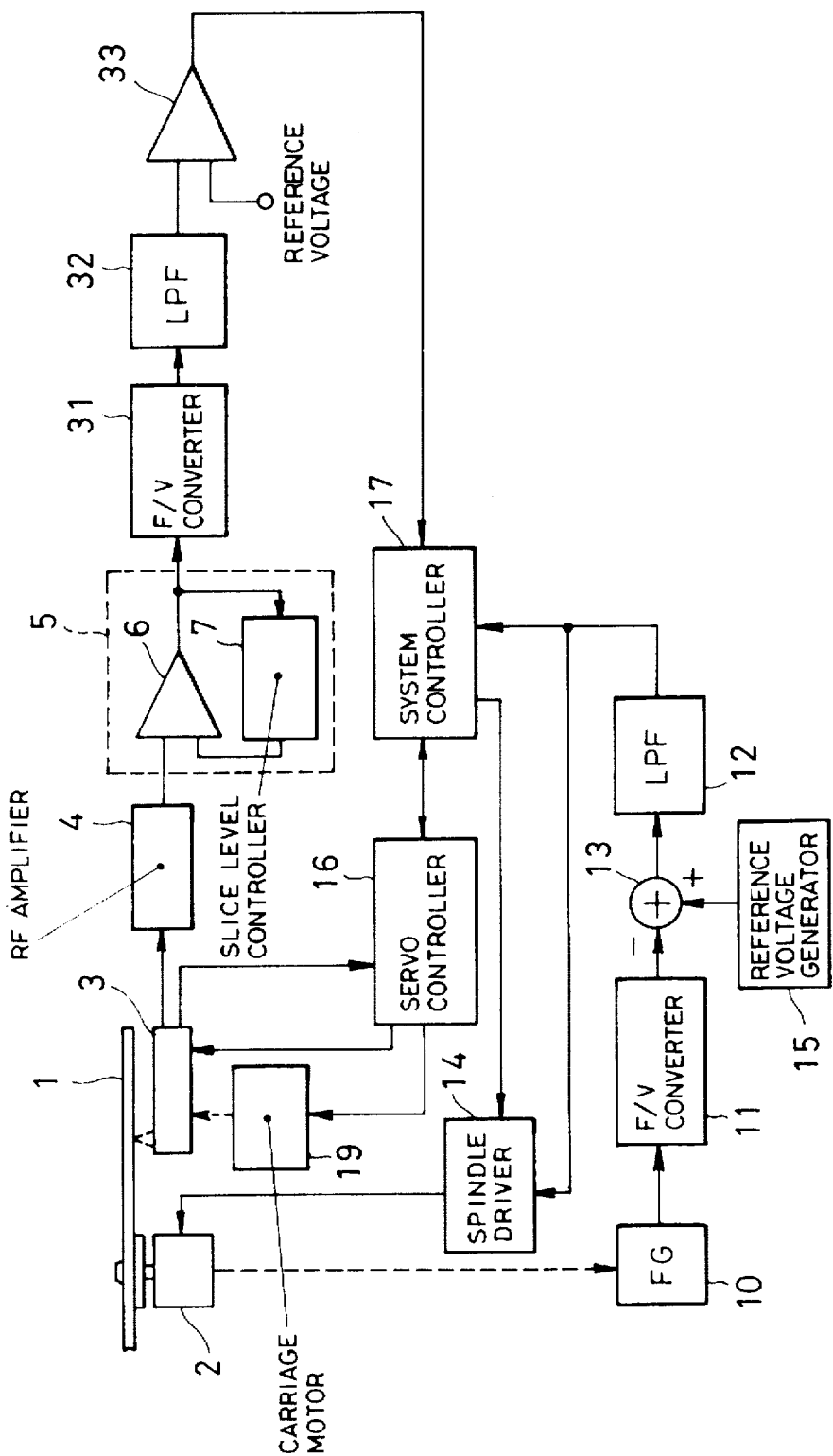

DISK DISCRIMINATING METHOD AND APPARATUS

BACKGROUND OF THE INVENTION

1. Field of the Invention

The present invention relates to a disk discriminating method and a disk discriminating apparatus in a disk player, which discriminate a plurality of disks of different recording systems.

2. Description of Background Information

Some disk players can automatically discriminate a plurality of disks of different recording systems and can play the disks properly. For example, a compatible disk player, which can play both a laser disk and a compact disk, discriminates the size of a disk placed on the turntable since those two disks have different sizes, and plays the disk using the method according to the discrimination result.

There are disks of the same size but with different recording densities, such as the compact disk and digital video disk. With such disks, it is not possible to directly read recorded signals to discriminate the target disk quickly. To solve to this shortcoming, an identification mark signal is recorded in the label portion of each disk, or a through-hole is formed in a cartridge and placed into the cartridge when loaded into a player. This approach is still disadvantageous, however, because of the need for the separate identification mark signal or through-hole and for the mechanism for detecting it.

OBJECTS AND SUMMARY OF THE INVENTION

Accordingly, it is a primary objective of the present invention to provide a disk discriminating method and disk discriminating apparatus that can accurately discriminate plural types of disks with different recording densities.

According to the first aspect of this invention, there is provided a disk discriminating method of discriminating plural types of disks with different recording densities, which comprises the steps of rotating a disk by a constant number of rotations and reading a recorded signal from the disk to acquire a read signal; detecting a maximum period or a minimum period of the read signal; and determining a type of the disk in accordance with the detected maximum period or minimum period.

According to the second aspect of this invention, there is provided a disk discriminating method of discriminating plural types of disks with different recording densities, which comprises the steps of rotating a disk by a constant number of rotations and reading a recorded signal from the disk to acquire a read signal; detecting a maximum inversion interval or a minimum inversion interval of the read signal; and determining a type of the disk in accordance with the detected maximum inversion interval or minimum inversion interval.

According to the third aspect of this invention, there is provided a disk discriminating method of discriminating plural types of disks with different recording densities, which comprises the steps of rotating a disk by a constant number of rotations and reading a recorded signal from the disk to acquire a read signal; detecting an average frequency of the read signal; and determining a type of the disk in accordance with the detected average frequency.

According to the fourth aspect of this invention, there is provided a disk discriminating apparatus for discriminating plural types of disks with different recording densities, which comprises means for rotating a disk by a constant number of rotations and reading a recorded signal from the disk to acquire a read signal; means for detecting a maximum period or a minimum period of the read signal; and means for determining a type of the disk in accordance with the detected maximum period or minimum period.

According to the fifth aspect of this invention, there is provided a disk discriminating apparatus for discriminating plural types of disks with different recording densities, which comprises means for rotating a disk by a constant number of rotations and reading a recorded signal from the disk to acquire a read signal; means for detecting a maximum inversion interval or a minimum inversion interval of the read signal; and means for determining a type of the disk in accordance with the detected maximum inversion interval or minimum inversion interval.

According to the sixth aspect of this invention, there is provided a disk discriminating apparatus for discriminating plural types of disks with different recording densities, which comprises means for rotating a disk by a constant number of rotations and reading a recorded signal from the disk to acquire a read signal; means for detecting an average frequency of the read signal; and means for determining a type of the disk in accordance with the detected average frequency.

BRIEF DESCRIPTION OF THE DRAWINGS

FIG. 5 is a block diagram showing a further embodiment of this invention.

DETAILED DESCRIPTION OF THE PREFERRED EMBODIMENTS

Preferred embodiments of the present invention will now be described with reference to the accompanying drawings.

Figure 1:
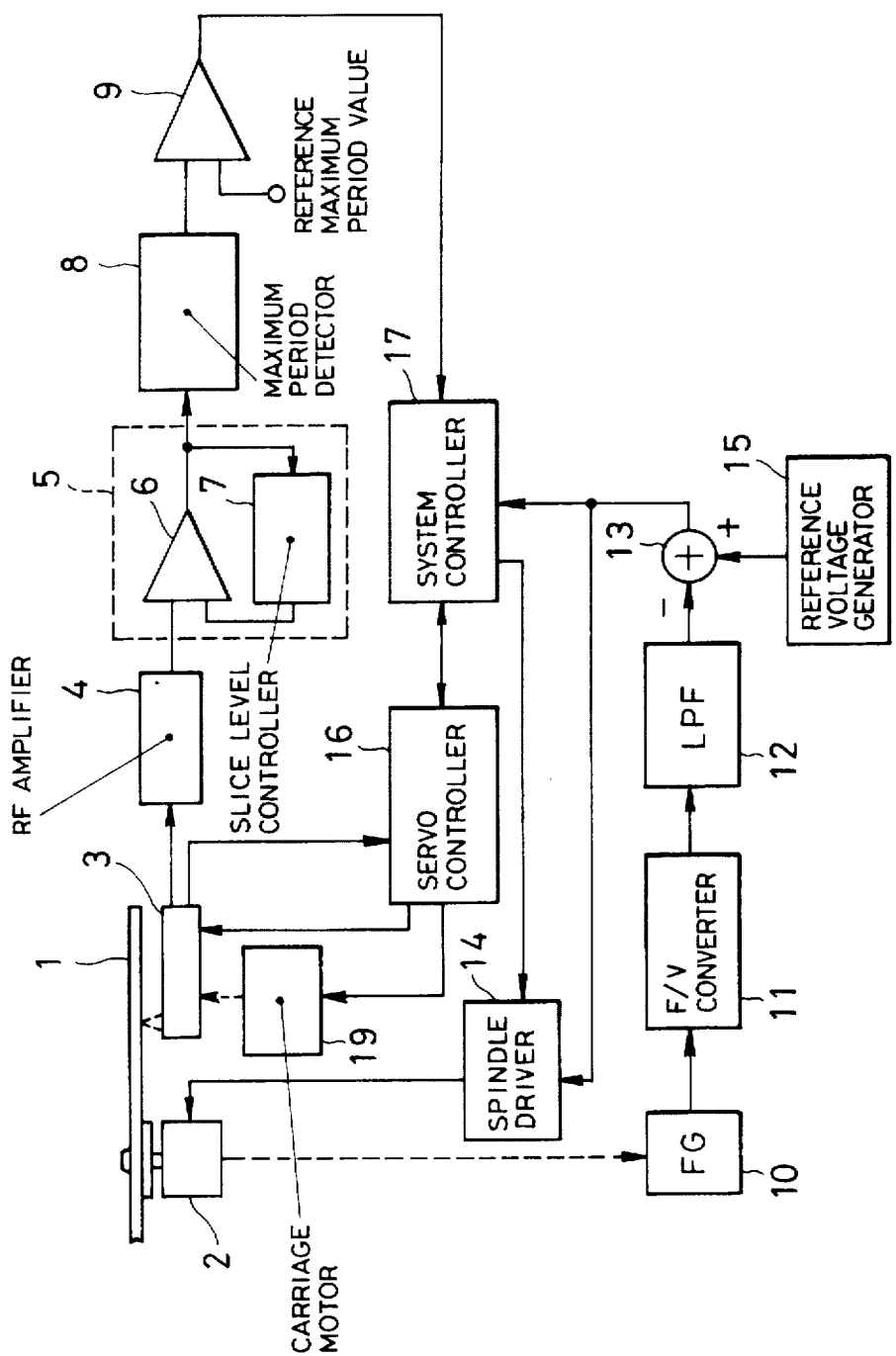
FIG. 1 is a block diagram showing one embodiment of the present invention.

FIG. 1 shows an optical disk player in which the disk discriminating method of the present invention is adapted. A disc-like optical disk 1 to be set on the optical disk player is either a low-density CD (Compact Disk) or a high-density DVD (Digital Video Disk). The optical disk player automatically discriminates whether the set optical disk 1 is a CD or DVD through a disk discriminating operation to be discussed later, and plays the disk 1 in accordance with the discrimination result.

The optical disk 1 is rotated by a spindle motor 2, and digital data recorded on the optical disk 1 is optically read by a pickup 3. An RF signal or read signal output from the pickup 3 is an analog signal indicative of the amount of the emitted light beam that is reflected from the optical disk 1 and is received by the pickup 3. This read signal is amplified by an RF amplifier 4, and the amplified signal is then binarized by a binarizing circuit 5. The binarizing circuit 5 comprises a comparator 6 and a slice level controller 7. The comparator 6 compares the output level of the RF amplifier 4 with the slice level, which is set as a threshold value by the slice level controller 7. The slice level controller 7 controls the slice level in such a way that the DC level of the output signal of the comparator 6 becomes zero.

A maximum period detector 8 is connected to the output terminal of the binarizing circuit 5. The maximum period detector 8 measures the interval from the rising of the output signal of the binarizing circuit 5 to the next rising and the interval from the falling of the output signal of the binarizing circuit 5 to the next falling by counting clock pulses through means of a counter. The maximum period detector 8 outputs the maximum value of the measured intervals as the maximum period. The output value of the maximum period detector 8 is compared with a reference maximum period value $T_{ref}$ by a comparator 9.

The spindle motor 2 is provided with an FG (Frequency Generator) 10 that generates an AC signal whose frequency accords to the rotation of the motor 2. The AC signal output from the FG 10 is converted to a DC voltage by an F/V (Frequency/Voltage) converter 11. The output voltage of the F/V converter 11 is supplied to a subtracter 13 via an LPF (Low-Pass Filter) 12. The subtracter 13 also receives a reference voltage corresponding to the reference number of rotations from a reference voltage generator 15. The voltage difference between the reference voltage and the output voltage of the LPF 12 is supplied to a spindle driver 14 from the subtracter 13. The spindle driver 14 drives the spindle motor 2 in such a way as to cancel the voltage difference from the subtracter 13.

A servo controller 16 is connected to the output of the pickup 3. The servo controller 16 operates in response to an instruction from a system controller 17. System controller 17 is a microcomputer, that performs various servo controls on the tracking servo, focus servo, and carriage servo in accordance with servo signals acquired from the light signal received by the pickup 3. The pickup 3 is designed to move in the radial direction of a disk by a carriage motor 19 of the carriage servo system. The system controller 17 serves to perform the general control of the player, and executes a disk discriminating operation as one of its control operations in accordance with the output signals of the comparator 9 and the subtracter 13.

Figure 2:
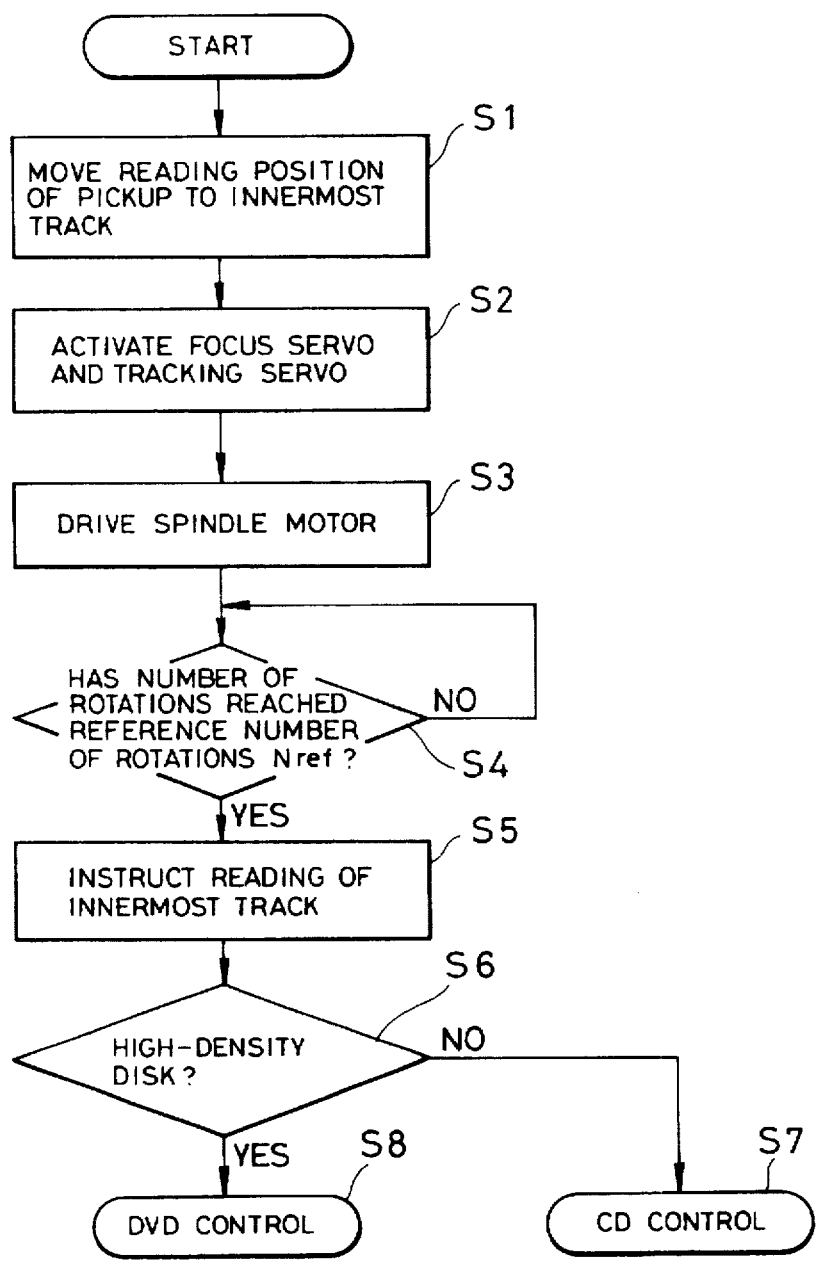
FIG. 2 is a diagram illustrating the operation of a system controller in the apparatus in FIG. 1.

When the optical disk 1 is placed on the turn table (not shown) of the player, the system controller 17 starts the disk discriminating operation in response to a detection output from unillustrated disk detecting means. In the disk discriminating operation, the system controller 17 first shifts the reading position of the pickup 3 to the innermost track of the optical disk 1 (step S1) as shown in FIG. 2. This is accomplished by moving the pickup 3 to a predetermined position by means of the carriage motor 19. After the pickup 3 is moved, the system controller 17 gives an instruction to the servo controller 16 to activate the focus servo system and tracking servo system (step S2) and gives an instruction to the spindle driver 14 to activate the spindle motor 2 (step S3). In response to this activation instruction, the spindle driver 14 starts driving the spindle motor 2. As the spindle motor 2 rotates, the FG 10 generates an AC signal whose frequency accords to the number of rotations of the motor 2. This AC signal is converted by the F/V converter 11 to a DC voltage, which is then integrated by the LPF 12. The resultant signal is supplied to the subtracter 13. The subtracter 13 generates the differential voltage between the DC voltage from the LPF 12 and the reference voltage corresponding to the reference number of rotations $N_{ref}$ from the reference voltage generator 15. This differential voltage indicates the difference between the number of rotations of the spindle motor 2 and the reference number of rotations $N_{ref}$. The spindle driver 14 drives the spindle motor 2 in accordance with the differential voltage to reduce the differential voltage, so that the number of rotations of the spindle motor 2 matches the reference number of rotations $N_{ref}$.

After execution of step S3, the system controller 17 determines if the number of rotations of the spindle motor 2 has reached the reference number of rotations $N_{ref}$ (step S4). This determination is based on the differential voltage from the subtracter 13. More specifically, when the differential voltage from the subtracter 13 is nearly 0 V, it is determined that the number of rotations of the spindle motor 2 has reached the reference number of rotations $N_{ref}$. When the number of rotations of the spindle motor 2 has reached the reference number of rotations $N_{ref}$, the system controller 17 instructs the reading of the innermost track (step S5). As a result, a recorded signal consisting of a sequence of pits on the innermost track on the optical disk 1 is read out by the pickup 3, and the read signal is amplified by the RF amplifier 4. The amplified signal is then binarized by the binarizing circuit 5. The output signal of the binarizing circuit 5 is a high level when the pit portion on the optical disk 1 is read, and is a low level when the land portion is read. In accordance with the output signal of the binarizing circuit 5, the maximum period of the recorded signal at the reference number of rotations is detected by the maximum period detector 8. The detected maximum period value output from the maximum period detector 8 is compared with the reference maximum period value $T_{ref}$ by the comparator 9. The comparison result is supplied to the system controller 17. The system controller 17 determines whether the optical disk 1 is a high-density disk or a low-density disk from the output signal of the comparator 9 (step S6). That is, when the maximum period value output from the maximum period detector 8 is equal to or greater than the reference maximum period value $T_{ref}$, the system controller 17 determines the optical disk 1 as a low-density disk and enters the CD control (step S7). When the maximum period value is smaller than the reference maximum period value $T_{ref}$, the system controller 17 determines the optical disk 1 as a high-density disk and enters the DVD control (step S8).

Although the maximum period of the output signal of the binarizing circuit 5 is detected and is compared with the reference maximum period value in this embodiment, the minimum period of the output signal of the binarizing circuit 5 may be detected to be compared with a reference minimum period value.

The following will explain why discrimination of the optical disk 1 as a low-density disk or a high-density disk can be made based on the value of the maximum period or minimum period of the recorded signal from the optical disk 1.

First, the number of rotations of the spindle motor 2, N (rpm), is given by $$N = 60/2\pi \times 10^3 \times v/r \qquad (1)$$

where v (m/sec) is the linear speed, and r (mm) is the reproduction radius indicating the reading position on the optical disk 1 by the pickup 3.

Given th at the innermost track of a CD is the program start position, the program start radius $r_0$ as the reproduction radius at the program start position is $r_0 = 25$ (mm) and the linear speed $V_{CD}$ of the CD is $V_{CD} = 1.3$ (m/sec). The number of rotations $N_{CD}$ of the CD at the innermost track becomes $N_{CD} = 497$ (rpm) from the equation (1).

The relationship among the playback time t (sec), track pitch p (μmm), the linear velocity v (th/sec) and the reproduction radius r (mm) is generally given by $$t = \pi/p \cdot v \cdot (r^2 - r_0^2) \qquad (2)$$

Assuming that the program start radius $r_0$ and the reproduction radius at the outermost track r of a DVD are respectively $r_0=25$ (mm) and $r=58$ (mm), the same as those of a CD, the maximum playback time $t_{DV}$ of the DVD is $t_{DV}=135\times 60$ (sec) and the track pitch $P_{DV}$ is $P_{DV}=0.725$ (μm). The linear velocity $v_{DV}$ of the $D_{VD}$ is expressed as follows from the equation (2).

$$v_{DV}=\pi/(t_{DV} \cdot P_{DV}) \cdot (r^2-r_0^2)=1.47 \text{ (m/sec)} \qquad (3)$$

The relationship among the minimum recording frequency $f_{mi}$, the linear velocity v and the minimum pit length $P_{mi}$ of the optical disk 1 is given by $$f_{mi}=v/(2 \cdot P_{mi}) \qquad (4)$$

Given that the minimum pit length $P_{miDV}$ of the DVD is $P_{miDV}=0.33$ (μm), the frequency $f_1$ when the shortest pit on the DVD is reproduced while the DVD is rotated at the number of rotations $N_{CD}=497$ (rpm) and $V_{CD}=1.3$ (m/sec) both of the CD, becomes as follows from the equation (4).

$$f_1=1.3/(2\times 0.33)=1.97 \text{ (MHz)} \qquad (5)$$

Given that the minimum pit length $P_{miCD}$ of the CD is $P_{miCD}=0.90$ (μm), the frequency $f_2$ when the shortest pit on the CD is reproduced while the CD is rotated at the number of rotations of the CD, becomes as follows from the equation (4).

$$f_2=1.3/(2=0.90)=0.722 \text{ (MHz)} \qquad (6)$$

As the periods of the frequencies $f_1$ and $f_2$, i.e., the minimum periods $T_1$ and $T_2$, are $T_1=1/f_1=0.508$ (μsec) and $T_2=1/f_2=1.39$ (μsec), $T_{1:T2}=1:2.73$. The disk discrimination can therefore be made accurately by rotating the CD and DVD at the number of rotations at the innermost track of the CD, $N_{CD}=497$(rpm), as the reference number of rotations $N_{ref}$ setting the minimum period $T_1$ at the innermost track of the DVD greater by 2.73 times than the minimum period $T_2$ at the innermost track of the CD, and setting the reference minimum period to lie between $T_1$ and $T_2$. From the recording format of the CD, the ratio of the minimum pit length to the maximum pit length is 3:11=1:3.67. The maximum period of the CD is a sync pattern of 11T (T is a unit pit length) and 11T. When this maximum period is expressed by $T_4$, $T_4=3.67T_2=5.10$ (μsec).

If the recorded signal on the DVD is a (1, 7) RLL (Run Length Limited) code, the ratio of the minimum pit length to the maximum pit length is 2:8=1:4 on the assumption that 2–3 modulation has been used. The maximum period of the DVD when the DVD is played at the number of rotations $N_{CD}=497$ (rpm) at the innermost track of the CD, is a sync pattern of 8T and 8T. When this maximum period is expressed by $T_3$, $T_3=4T_1=2.03$ (μsec). The ratio of the maximum period $T_3$ to the maximum period $T_4$ is $T_3:T_4=2.03:5.10=1:2.51$. The disk discrimination can therefore be made accurate by rotating the CD and DVD the same number of rotations at the innermost track of the CD, $N_{CD}=497$(rpm), as the reference number of rotations $N_{ref}$ setting the maximum period $T_3$ at the innermost track of the DVD greater by 2.51 times than the maximum period $T_4$ at the innermost track of the CD, and setting the reference maximum period value $T_{ref}$ to lie between $T_3$ and $T_4$.

Now, the disk discrimination at the number of rotations of the DVD will be discussed. Because asynchronous reproduction is performed for the DVD, the following will describe when reproduction is made at twice the normal linear velocity. From the equations (1) and (2), the number of rotations $N_{2DV}$ for the reproduction from the innermost track of the DVD at twice the normal linear velocity becomes $$N_{2DV}=60/2\pi \times 10^3 \times (2\times 1.47)/25=1123 \text{(rpm)} \qquad (7)$$

From the equation (4), the minimum recording frequency $f_5$ and the period $T_5$ of the DVD at $2_{vDV}=2.94$ (m/sec), are $f_5=1.47/0.33=4.45$ (MHz) and $T_5=0.224$ (μsec).

The frequency $f_6$ and the period $T_6$ of the CD when the minimum pit at the innermost track is reproduced while rotating the CD at twice the normal number of rotations $N_{2DV}=1123$ (rpm) of the DVD, are $f_6=1.47/0.90=1.63$ (MHz) and $T_6=0.612$ (μsec). The ratio of the minimum period $T_5$ to the minimum period $T_6$ is $T_5:T_6=0.224:0.612=1:2.73$.

The disk discrimination can therefore be made accurate by rotating the CD and DVD twice the number of rotations of the DVD, $N_{2VD}=1123$ (rpm), as the reference number of rotations $N_{ref}$ setting the minimum period $T_5$ 5 at the innermost track of the DVD greater by 2.73 times than the minimum period $T_6$ at the innermost track of the CD, and setting the reference minimum period value to lie between $T_5$ and $T_6$.

Further, the maximum period $T_7$ of the DVD and the maximum period $T_8$ of the CD when the DVD and CD are played at twice the linear velocity of the DVD are $$T_7=4T_5=0.896 \text{ (μsec)}$$

$$T_8=3.67T_6=2.25 \text{ (μsec)} \qquad (8)$$

The ratio of the maximum period $T_7$ to the maximum period $T_8$ is $$T_7:T_8=0.896:2.25=1:2.51 \qquad (9)$$

The disk discrimination can be made accurate by rotating the CD and DVD the same number of rotations at the innermost track of the CD, $N_{2DV}=1123$ (rpm), as the reference number of rotations $N_{ref}$ setting the maximum period $T_7$ at the innermost track of the DVD greater by 2.51 times than the maximum period $T_8$ at the innermost track of the CD, and setting the reference maximum period value $T_{ref}$ to lie between $T_7$ and $T_8$.

Figure 3:
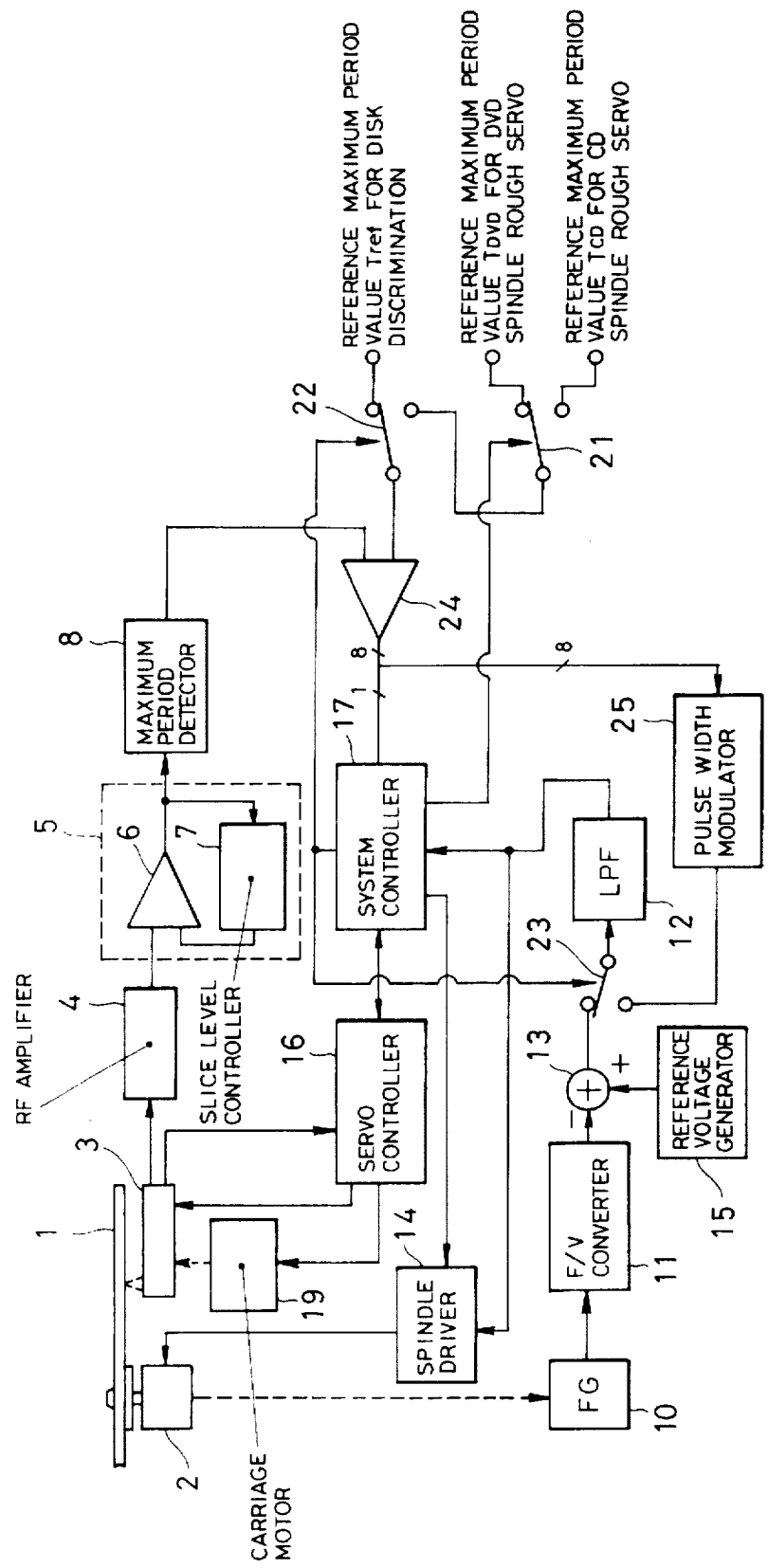
FIG. 3 is a diagram illustrating how a structure for the disk discrimination is shared by a spindle servo system.

FIG. 3 shows the structure when the structure shown in FIG. 1 is shared by the rough adjusting system of the spindle servo. There are three changeover switches 21 to 23 that are controlled by the system controller 17. The changeover switch 21 selectively relays one of the reference maximum period value $T_{DVD}$ for the DVD spindle rough servo and the reference maximum period value $T_{CD}$ for the CD spindle rough servo to the changeover switch 22 in accordance with an instruction from the system controller 17. The changeover switch 22 selectively relay s one of the reference maximum period value for the spindle rough servo from the changeover switch 21 and the reference maximum period value $T_{ref}$ for disk discrimination to a comparator 24 in accordance with an instruction from the system controller 17. This comparator 24 compares the maximum period detected by the maximum period detector 8 with the reference maximum period value from the changeover switch 22, generates an 8-bit difference output as the comparison result, and supplies only the MSB (Most Significant Bit) of the eight bits to the system controller 17. The 8-bit difference output is supplied to a pulse width modulator 25. The pulse width modulator 25 generates a pulse-width output corresponding to the 8-bit difference output at a given period. The output pulse of this pulse width modulator 25 is supplied to the changeover switch 23, which is inserted between the subtracter 13 and the LPF 12. While the subtracter 13 in the structure shown in FIG. 1 is located at the subsequent stage of the LPF 12, the subtracter 13 in FIG. 3 is located at the preceding stage of the LPF 12 and outputs the differential voltage between the output voltage of the F/V converter 11 and the reference voltage to the changeover switch 23. The changeover switch 23 selectively relays one of the differential voltage from the subtracter 13 and the output pulse of the pulse width modulator 25 to the LPF 12 in accordance with an instruction from the system controller 17. The output signal of the LPF 12 is supplied to the system controller 17 and the spindle driver 14. The other structure is the same as that shown in FIG. 1.

In the structure shown in FIG. 3, the system controller 17 generates a switch instruction to the changeover switches 22 and 23 as to interlock the operations of the changeover switches 22 and 23. During the above-described disk discriminating operation, the changeover switch 22 is in a state to selectively relay the reference maximum period value $T_{ref}$ to the comparator 24, as shown in FIG. 3. The changeover switch 23 is in a state to selectively relay the output voltage of the subtracter 13 to the LPF 12. When the disk discriminating operation proceeds to step S7 or step S8 in FIG. 2, the changeover switch 22 is switched to a state of selectively relaying the reference maximum period value from the changeover switch 21 to the comparator 24, and the changeover switch 23 is switched to a state of selectively relay the output pulse of the pulse width modulator 25 to the LPF 12.

When the optical disk 1 is determined to be a DVD and the flow proceeds to step S8 in FIG. 2 in the disk discriminating operation, the changeover switch 21 relays reference maximum period value TDVD for the DVD spindle rough servo to the changeover result, 2. As a result, the comparator 24 compares the maximum period detection value output from the maximum period detector 8 with the reference maximum period value $T_{DVD}$ and supplies the comparison result to the pulse width modulator 25. The pulse signal from the pulse width modulator 25 is integrated by the LPF 12, and the resultant signal is supplied to the spindle driver 14. Consequently, the spindle driver 14 drives the spindle motor 2 so that the maximum period detection value from the maximum period detector 8 becomes equal to the reference maximum period value $T_{DVD}$. The DVD is therefore rotated with its linear velocity roughly adjusted to the specified linear velocity $V_{DV}$. When the optical disk 1 is determined as a CD and the flow proceeds to step S7 in FIG. 2 in the disk discriminating operation, the changeover switch 21 relays reference maximum period value $T_{CD}$ for the CD spindle rough servo to the changeover switch 22. As a result, the comparator 24 compares the maximum period detection value output from the maximum period detector 8 with the reference maximum period value $T_{CD}$ and supplies the comparison result to the pulse width modulator 25. Likewise the case of the DVD, the pulse signal from the pulse width modulator 25 is integrated by the LPF 12, and the resultant signal is supplied to the spindle driver 14. Consequently, the spindle driver 14 drives the spindle motor 2 so that the maximum period detection value from the maximum period detector 8 becomes equal to the reference maximum period value $T_{CD}$. The CD is therefore rotated with its linear velocity roughly adjusted to the specified linear velocity $V_{CD}$.

Figure 4:
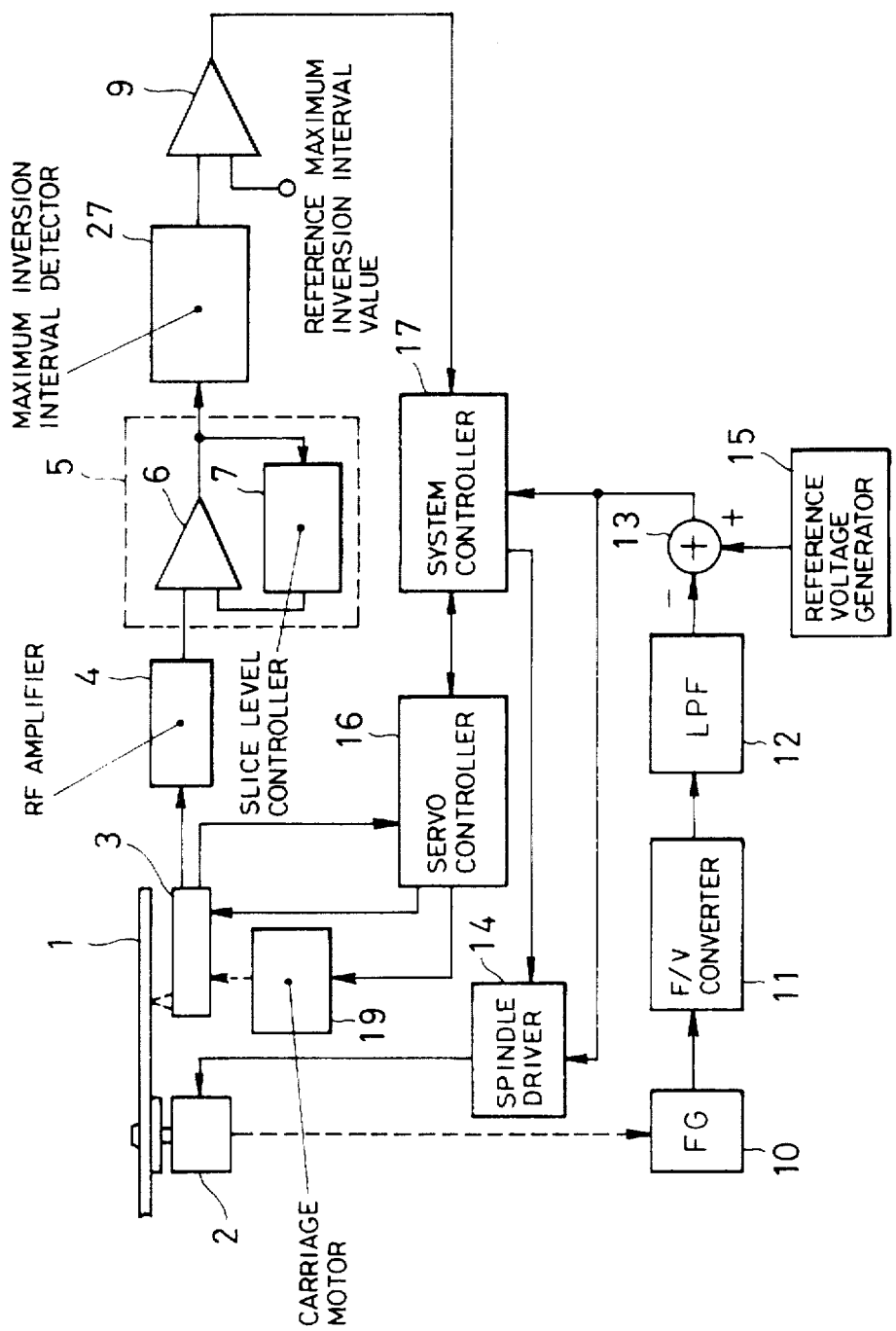
FIG. 4 is a block diagram showing another embodiment of this invention.

Although the maximum period or minimum period of the output signal of the binarizing circuit 5 is detected in the above-described embodiment, the maximum inversion interval (half the maximum period) or the minimum inversion interval (half the minimum period) of the output signal of the binarizing circuit 5 may be detected. For example, a maximum inversion interval detector 27 may be provided at the output stage of the binarizing circuit 5 as shown in FIG. 4, so that the maximum inversion interval detected by this detector 27 is compared with the reference maximum inversion interval by the comparator 9.

Further, the disk discrimination can be made based on the average value of the frequency of the RF signal output from the pickup 3. The average frequency of the recorded signal from a DVD is higher than that of a CD. It is therefore possible to discriminate whether the target disk is a DVD or a CD by comparing the average value of the frequency of the RF signal, acquired from the recorded signal read from the innermost track when the disk is rotated at the reference number of rotations, with the reference average frequency. The reference average frequency is set to a value between the average frequency of the recorded signal from the DVD and that from the CD. More specifically, the output signal of the binarizing circuit 5 is converted to a DC voltage according to the frequency by an F/V converter 31 whose output voltage is supplied to a comparator 33 via an LPF 32 as an integrator as shown in FIG. 5. The comparator 33 compares the output voltage of the LPF 32 with the reference voltage corresponding to the reference average frequency. The output signal of this comparator is the disk discriminating signal which is to be supplied to the system controller 17. The other structure is the same as that shown in FIG. 4.

Although a CD is used as a low-density disk and a DVD as a high-density disk in the above-described embodiments, disks to be discriminated are not limited to those types. This invention may be adapted to a system of discriminating other two types of disks with other and different recording densities. Further, it is possible to discriminate three or more disks with different recording densities or use a plurality of reference values (e.g., two different reference maximum period values). Although disk discrimination is made from the read signal acquired from the recorded signal at the innermost track of an optical disk in the above-described embodiments, this invention is not limited to this particular type, but may be made from a read signal acquired by reading the recorded signal at the outermost track or a predetermined intermediate track, or reading recorded signal over a plurality of tracks.

In short, according to the disk discriminating method of this invention, while a disk is rotated by a constant number of rotations, a recorded signal is read from the disk to acquire a read signal, one of the maximum period, minimum period, maximum inversion interval, minimum inversion interval and average frequency of the read signal is detected, and the type of the disk is determined in accordance with the detected value. It is therefore possible to accurately discriminate plural types of disks with different recording densities. This invention also has such an advantage that a disk player just needs the additional provision of a simple circuit, and no other special mechanism is required.

What is claimed is:

1. A disk discriminating method of discriminating plural types of disks with different recording densities, comprising the steps of:

rotating a disk by a constant number of rotations and reading a recorded signal from said disk to acquire a read signal;

detecting a maximum period or a minimum period of said read signal; and determining a type of said disk in accordance with said detected maximum period or minimum period.

2. A disk discriminating method of discriminating plural types of disks with different recording densities, comprising the steps of:

rotating a disk by a constant number of rotations and reading a recorded signal from said disk to acquire a read signal;

detecting a maximum inversion interval or a minimum inversion interval of said read signal; and determining a type of said disk in accordance with said detected maximum inversion interval or minimum inversion interval.

3. A disk discriminating apparatus for discriminating plural types of disks with different recording densities, comprising:

means for rotating a disk by a constant number of rotations and reading a recorded signal from said disk to acquire a read signal;

means for detecting a maximum period or a minimum period of said read signal; and means for determining a type of said disk in accordance with said detected maximum period or minimum period.

4. A disk discriminating apparatus for discriminating plural types of disks with different recording densities, comprising:

means for rotating a disk by a constant number of rotations and reading a recorded signal from said disk to acquire a read signal;

means for detecting a maximum inversion interval or a minimum inversion interval of said read signal; and means for determining a type of said disk in accordance with said detected maximum inversion interval or minimum inversion interval.

* * * * *